Patented Nov. 15, 1927.

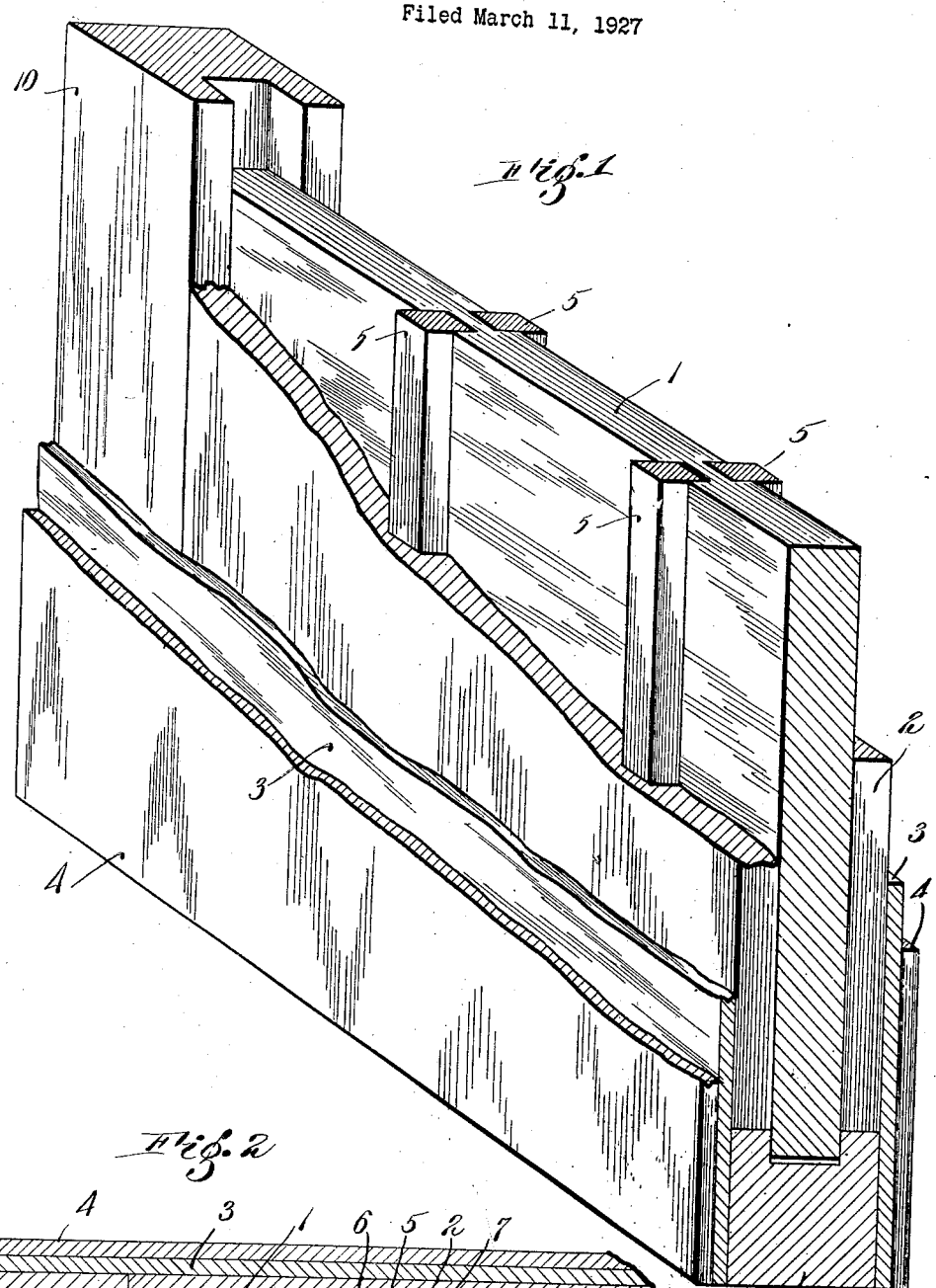
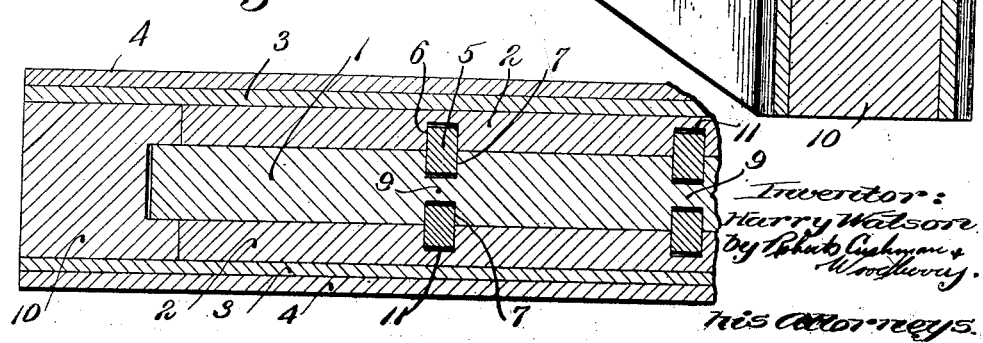

1,649,555

UNITED STATES PATENT OFFICE.

HARRY WATSON, OF CHELSEA, MASSACHUSETTS.

LAMINATED PANEL.

Application filed March 11, 1927. Serial No. 174,466.

This invention relates to an improved laminated panel construction which is adaptable to a wide variety of uses, being particularly advantageous when used for a door.

The present invention discloses a panel construction which permits the use of a main lamina or core member with associated laminæ of thinner cross section and which prevents warping of the resulting panel in either direction even under adverse conditions of heat, moisture, and the like. The means utilized for securing the laminæ together so reduces the effective cross section of the main laminæ that the tendency of the same to warp does not appreciably affect the composite panel; said means also overcoming any tendency toward relative movement between the plies of the composite panel. The preferred manner of arriving at this desirable result is by the provision of keys or splines spaced at modular distances upon either face of adjoining laminæ and received in grooves in the main lamina and in corresponding grooves in the associated laminæ. Preferably grooves upon opposite faces of the central lamina are located opposite each other so that the section of that member is materially reduced betwen each pair of grooves while the thickness of the wood in the adjoining laminæ may be similarly reduced by the corresponding grooves therein. Furthermore, the grooves are arranged to permit drainage of excess agglutinant when the plies are forced together under pressure, and the keys or splines are advantageous in facilitating assembly of outer edging pieces upon the panel.

The above and further advantageous features of the invention will be apparent to those skilled in the art upon a reading of the subjoined description and claims in conjunction with the accompanying drawings in which Fig. 1 is a broken perspective view of a portion of the preferred form of panel; and Fig. 2 is a detailed cross sectional view of the same.

The accompanying drawings disclose a laminated or wooden panel which is formed of laminæ of wood, the grain of the wood in adjoining laminæ running in opposite directions. The panel comprises a comparatively thick core member or central lamina 1 and secondary laminæ 2 of considerably thinner section upon either face thereof; while, if desired, upon the outer faces of laminæ 2 may be located the thin wooden plies 3 and 4, the grain of the wood in plies 3 running in one direction and the grain of plies 4 running in the opposite direction. Referring more particularly to the sectional view of Fig. 2, it will be apparent that the grain of the intermediate lamina 1 is parallel to the section while the grain of the adjoining laminæ 2 is cut by the section; the grain of the plies 3 in turn paralleling the section and the grain of plies 4 being cut by the section.

In order to avoid warping of the resulting panel which is thus formed I secure the laminæ 2 to the core member 1 by the means of keys or splines 5. These keys are preferably shaped to extend substantially the entire length of the laminæ 2 and engage grooves 6 in these laminæ and corresponding grooves 7 in the core member. The keys 5 are arranged to have their grain run longitudinally in the conventional manner and in a direction similar to that of the laminæ 2. Preferably the combined depth of the grooves 6 and 7 is somewhat greater than the depth of the keys 5 to leave a clearance space at the bottom of the grooves as designated by numeral 11. Preferably grooves 7 upon opposite faces of core member 1 adjoin each other or are arranged in pairs so that the section of the central lamina is considerably reduced between each pair of grooves 7, as designated by the numeral 9.

Plies 1 and 2 and keys 5 have their adjoining faces coated with an adhesive, such as glue, and are then firmly pressed together; the grooves 6 and 7 then act as ducts to permit the drainage of excess agglutinant from between the plies, thus avoiding pocketing of the same as commonly occurs in the manufacture of ply wood panels.

A panel of this character may conveniently be provided with edging pieces 10. These members may conveniently be grooved to fit firmly about opposite marginal faces of lamina 1, as shown. Preferably plies 3 and 4 extend outwardly upon either side of the member 10 and conceal the side portions thereof so that the panel as viewed in side elevation has a continuous surface formed by an outer ply 4 and so that at the edge of the panel the member 10 and the edges of plies 3 and 4 may be observed while the edges of lamina 1 and laminæ 2 are concealed. The ends of keys 5 are slightly spaced from the edge of core member 1 to permit the edging pieces readily to be applied thereto. The members 10 are easily applied to laminæ 1 and 2 without causing relative sliding therebetween due to the positive keying of these laminæ to each other.

A laminated panel formed in this manner is adapted to withstand exposure to extremely adverse conditions of moisture and temperature and yet not appreciably to warp as a result of the same. This advantageous result is attributable to the arrangement of the keyways 6 and 7 and the keys 5 in the main and secondary laminæ 1 and 2. Not only does the provision of these keyways reduce the effective cross section of the laminæ which tends to cause warping of the same, but the keys provide additional highly effective means for securing the plies together so that each lamina is firmly secured to an adjoining laminæ in which the grain of the wood runs in the opposite direction. Furthermore, the arrangement of keys in this manner prevents relative transverse movement between the faces of the laminæ which is a concomitant of warping in certain directions. Since the sides of the grooves in each of the laminæ are firmly glued to the faces of the keys, each of the sections of the laminæ is reinforced by separate wooden members which are secured to transverse surfaces formed by the sides of the grooves, as well as being reinforced by the adjoining lamina which is secured to its faces. Moreover, this form of securing means affords the additional advantage of providing longitudinal grooves for drainage of excess agglutinant, thus avoiding the formation of pools or blisters of the adhesive material between faces of adjoining laminations, a fault which is likely to occur in the manufacture of laminated or ply wood panels. Provision of the clearance spaces at the bottom of the grooves not only permits this advantageous result but also allows normal shrinkage of the panel to take place without being interfered with by the keys or without causing the keys to so affect the laminæ that they are distorted from their original form or original relation to each other.

I claim:

1. A laminated door comprising adjoining laminæ in which the grain of the wood runs in opposite directions, a multiplicity of registering grooves in abutting faces of the laminæ, keys in said grooves securing the laminæ together, said grooves having a depth to reduce the effective thickness of the laminæ by at least one third.

2. A laminated door comprising a main wooden lamina, thinner wooden laminæ at either side of said main lamina with the grain thereof running substantially at right angles to that of the main lamina, grooves in opposite faces of said main lamina, said grooves being arranged in pairs and having a depth so that the effective thickness of the lamina is reduced by at least one-third, registering grooves in the thinner laminæ, and keys in the grooves securing the laminæ together.

3. A laminated panel comprising a central wooden lamina, adjoining wooden laminæ at either side of said central lamina with the grain thereof extending in a quite different direction than that of the central lamina, grooves in opposite faces of said central lamina, said grooves being of sufficient depth materially to reduce the effective thickness of the central lamina, registering grooves in adjoining faces of the adjoining laminæ, the latter grooves being of sufficient depth materially to reduce the effective thickness of these laminæ, and keys in the grooves securing the laminæ to each other, each of said keys cutting across the grain of one lamina, the effective thickness of the main lamina and the added effective thicknesses of the two adjoining laminæ being substantially of the same order, whereby the effective tendency of each lamina to warp in one direction may be overcome by the resistance to warping in that direction of the adjoining lamina or laminæ.

4. A laminated door comprising a central wooden lamina, adjoining wooden laminæ at either side of said central lamina with the grain thereof running substantially at right angles to that of the central lamina, grooves in opposite faces of said central lamina, said grooves having a considerable depth whereby the effective thickness of the central lamina is materially reduced thereby, registering grooves in the adjoining laminæ, said grooves having a considerable depth whereby the effective thicknesses of these laminæ is also materially reduced, keys in the grooves securing the laminæ together, each of said keys cutting across the grain of one lamina, the total thickness of the thinner laminæ being substantially of the order of the thickness of the central lamina so that the laminæ may effectively resist the tendencies of each other to warp.

HARRY WATSON.